Patented Oct. 12, 1926.

1,602,726

UNITED STATES PATENT OFFICE.

ALONZO B. TURK, OF OKMULGEE, OKLAHOMA.

WATERPROOFING PROCESS.

No Drawing.  Application filed June 16, 1924. Serial No. 720,460.

This invention relates to a process and product for treating structural surfaces of brick, concrete, stone, iron and the like with a water-proofing which may be also employed for decorative effects.

It has been proposed in the manufacture of bricks and concrete blocks to incorporate with the green mixture sodium silicate and calcium chloride, thus providing in advance an insoluble calcium silicate which merely forms an element of the mass rather than a distinct pore filling substance.

It is an object of my invention to provide a process for filling the pores of a structural element before or after erection with a soluble silicate and calcium chloride so that the insoluble silicate of calcium is formed directly in the pores to effectually close the same, a subsequent coating of a solution of wax or paraffine and a volatile solvent, or melted wax or paraffine being applied directly to the surface of the structural element impregnated with the insoluble silicate.

A further object of the invention is the provision of a process for not only impregnating the pores of a structural element with a water-proof pore filling agent and a subsequent surface application of a water-resistance coating but for producing a decorative effect simultaneously with the treatment.

This invention will be best understood from a consideration of the following detailed description; nevertheless it is to be understood that the invention is not confined to the disclosure, being susceptible of such changes and modifications which shall define no material departure from the salient features of the invention as expressed in the appended claims.

It is well known that certain kinds of stone and concrete or hollow tile masonry will permit the passage of water due to the porous condition of such elements and also due to the capillary attraction and to the fact that a difference of pressure exists upon opposite sides of the walls built with such material. This difference of pressure between the surfaces is particularly recognized as the cause of water passing from the exterior to the interior surface of the walls of buildings in which the flow is from the cold exterior regions to the inner warmer regions of the space enclosed by said walls. It is also well known that it requires from five to seven years for cement to be water-proof through contact with air, dust and water.

It is therefore necessary to not only apply a surface coating to prevent the passage of heat and air but to impregnate the pores of such walls to a certain depth with an insoluble substance predetermined to check the flow of water in advance of such coating or to provide a substantially impervious foundation for a later coating of insulating material to prevent the destruction of the impregnating elements.

In carrying out my invention I propose to saturate the pores of such walls with a soluble silicate, preferably sodium silicate or water-glass. After the wall has become sufficiently dry a calcium chloride solution is brushed or sprayed on in any approved manner. It may be noted here that where the walls are formed of plaster or other material containing sufficient lime the treatment with the calcium chloride may be dispensed with since sufficient lime is present in plaster and like materials to form the insoluble calcium silicate which closes the pores of the walls. A water-proofing coating is then applied to the surface of the wall after the same has become sufficiently dry after its treatment with calcium chloride. The water-proof solution consists of the following formula:

¾ pound of wax or paraffine, 2 pints of spirits of turpentine, 1 pint of di-sulphide of carbon, sufficient gasoline or naphtha to complete a gallon.

The wax or paraffine is melted over a slow flame and care must be exercised that the vapors from the melted wax do not come in contact with the flame. The melted paraffine is then removed from the fire and at a point of safety the di-sulphide of carbon is added and thoroughly stirred into the paraffine. The desired quantity of turpentine is then added and likewise stirred into the mixture after which gasoline or naphtha is added to complete a gallon of the waterproof coating. This solution is then applied to the dry surface of the wall after several treatments by sodium silicate and calcium chloride. This water-proof solution is applied by means of a brush or spray or in any other well known manner.

Since the sodium silicate is substantially colorless the color of the wall treated will not be affected and where desired sand may be blown against the surface of the wall treated with the sodium silicate which will give a very pleasing effect.

The direct treatment of the wall with the sodium silicate and dissolved paraffine aids materially in bringing back the natural color of the walls as well as water-proofing the same, but nevertheless pigments may be applied to the sodium silicate for providing any decorative effect desired.

The sodium silicate or other soluble silicate penetrates the pores of the surface to a certain depth and when dry the application of the calcium chloride forms an insoluble calcium silicate because of the reaction between the silicate of soda and the soluble calcium chloride so that the insoluble silicate within the minute pores and crevices of the portions of the walls adjacent its surface renders the surface substantially impenetratable by water. The treatment of the surface by an application of the paraffine in the volatile solvent closes any pores that were not completely closed by the formation of calcium silicate. Furthermore the water-proof coating not only aids in closing the pores liable to seepage but also protects the walls treated with the calcium silicate from moisture and oxidation.

It must be borne in mind that while I have described the second step in the treatment as consisting of certain proportions of paraffine, carbon di-sulphide, turpentine, gasoline or naphtha all but one of the solvents may may eliminated to produce effective results. The paraffine may also be melted and applied directly to the surface.

It is frequently desirable to vary the process in order to secure decorative effects from the treatment simultaneously with the treatment. Therefore pigments, sand, mica or other foreign material capable of producing decorative effects with the sodium silicate or other soluble alkali solution may be applied in a well known manner to the surface after the treatment with the sodium silicate, or such materials may be added directly to the solution of the calcium chloride or other metallic salt and applied directly to the wall, or these materials may be added to the solution of wax or paraffine before its application.

In the preferred form, however, I mix the decorative material with the sodium silicate or other soluble alkali silicate or apply it as a separate step after the application of the sodium silicate.

It must be borne in mind that while I have stated calcium chloride is employed in conjunction with the sodium silicate that other soluble salt of any of the heavy metals, such as magnesium chloride, ferrous sulphate, etc., may be employed although not so economically.

Further other soluble alkali silicates may be used instead of sodium, it only being necessary to fill the pores of the masonry with some silicate which is not affected by moisture.

What I claim is:

1. The process of treating structural elements which comprises impregnating the pores of the element with an insoluble calcium salt and applying a coat of water-proofing material which consists of ¾ pound of paraffine, 2 pints of spirits of turpentine, 1 pint of bi-sulphide of carbon and sufficient gasoline to complete a gallon mixture.

2. A process of treating structural elements which comprises impregnating the pores of the elements with sodium silicate and when dry saturating the sodium silicate impregnated elements with a solution of calcium chloride and then applying a coat of water-proofing material which consists of ¾ of a pound of paraffine, 2 pints of spirits of turpentine, 1 pint of bi-sulfide of carbon and sufficient gasoline to complete a gallon mixture.

3. A process of treating structural elements which comprises impregnating the pores of the elements with sodium silicate and when dry saturating the sodium silicate impregnated element with a solution of calcium chloride, and then applying a coat of water-proofing material which consists of paraffine, spirits of turpentine, bi-sulfide of carbon and a solvent such as gasoline.

4. A process for treating structural elements formed of concrete which comprises impregnating the pores of the concrete with an insoluble calcium salt and then applying a coat of water-proofing material consisting of paraffine, turpentine, bi-sulfide of carbon and gasoline.

In testimony whereof I affix my signature.

A. B. TURK.